United States Patent
Yoo (10) Patent No.: US 9,570,936 B2
(45) Date of Patent: Feb. 14, 2017

(54) WIRED/WIRELESS CHARGING APPARATUS AND CIRCUIT

(71) Applicant: Samsung Electronics Co. Ltd., Suwon-si, Gyeonggi-do (KR)

(72) Inventor: Jeonghoon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 755 days.

(21) Appl. No.: 13/865,571

(22) Filed: Apr. 18, 2013

(65) Prior Publication Data

US 2013/0278207 A1    Oct. 24, 2013

(30) Foreign Application Priority Data

Apr. 20, 2012  (KR) .................. 10-2012-0041221

(51) Int. Cl.
*H02J 7/02* (2016.01)
*H02J 7/00* (2006.01)

(52) U.S. Cl.
CPC .............. *H02J 7/025* (2013.01); *H02J 7/0027* (2013.01); *H02J 7/0042* (2013.01); *H02J 7/0052* (2013.01); *Y02B 40/90* (2013.01)

(58) Field of Classification Search
CPC ............................. H02J 7/0052; H02J 7/025
USPC ................................................ 320/108, 137
See application file for complete search history.

(56) References Cited

U.S. PATENT DOCUMENTS

| | | | | |
|---|---|---|---|---|
| 7,685,453 | B2 * | 3/2010 | Yang ...................... | G06F 1/1632 320/137 |
| 2006/0223579 | A1 * | 10/2006 | Whitaker ................ | G06F 1/266 455/557 |
| 2007/0121284 | A1 * | 5/2007 | Iida ........................ | G06F 1/1616 361/679.32 |
| 2009/0096413 | A1 * | 4/2009 | Partovi ................... | H01F 5/003 320/108 |
| 2010/0146308 | A1 * | 6/2010 | Gioscia ................. | G06F 1/1632 713/300 |
| 2010/0264871 | A1 | 10/2010 | Matouka et al. | |
| 2011/0050164 | A1 * | 3/2011 | Partovi ................... | H01F 5/003 320/108 |
| 2011/0140538 | A1 | 6/2011 | Jung et al. | |
| 2011/0241607 | A1 * | 10/2011 | Wiegers .................. | H02J 7/025 320/108 |
| 2012/0091950 | A1 * | 4/2012 | Campanella ............ | H02J 5/005 320/108 |

(Continued)

FOREIGN PATENT DOCUMENTS

CN          201576719 U       9/2010
CN          101867203 A       10/2010

(Continued)

*Primary Examiner* — Richard Isla Rodas
*Assistant Examiner* — Dung V Bui
(74) *Attorney, Agent, or Firm* — Jefferson IP Law, LLP (57) ABSTRACT

A wired/wireless charging apparatus capable of performing wired charging and wireless charging and a circuit are provided. The wired/wireless charging apparatus includes a body including a wired charging circuit for wired charging, a wireless charging circuit for wireless charging, and a battery mounting space a cover coupled with the body and including a transmission coil generating a magnetic field for the wireless charging, wherein the body and the cover including a contact unit for electrically connecting the transmission coil to the wireless charging circuit.

15 Claims, 8 Drawing Sheets

(56) References Cited

U.S. PATENT DOCUMENTS

2013/0278207 A1* 10/2013 Yoo .................... H02J 7/025
                                                320/108

FOREIGN PATENT DOCUMENTS

| CN | 201656503 U | 11/2010 |
| CN | 101919139 A | 12/2010 |
| CN | 101971453 A | 2/2011 |
| CN | 201829996 U | 5/2011 |
| CN | 103378639 A | 10/2013 |

\* cited by examiner

WIRED/WIRELESS CHARGING APPARATUS AND CIRCUIT

PRIORITY

This application claims the benefit under 35 U.S.C. §119(a) of a Korean patent application filed on Apr. 20, 2012 in the Korean Intellectual Property Office and assigned Serial No. 10-2012-0041221, the entire disclosure of which is hereby incorporated by reference.

BACKGROUND OF THE INVENTION

1. Field of the Invention

The present invention relates to a wired/wireless apparatus for charging a battery of a portable terminal and a wired/wireless charging circuit thereof. More particularly, the present invention relates to a wired/wireless apparatus for charging a battery through at least one of wired charging and wireless charging and a wired/wireless charging circuit thereof.

2. Description of the Related Art

In general, various functions are increasingly added to a portable terminal. That is, a portable terminal of the related art includes various convenience functions such as a voice call function, an image call function, a wireless interne function, a digital audio player function, and a digital broadcasting function. Power is supplied to the portable terminal from an embedded battery. However, a use time of the battery is limited. Accordingly, the user must charge the battery. In order to charge the battery, the user must electrically connect the portable terminal to a charger. The user must charge the battery using a separate charger. Due to the restriction of the limited use time of the battery, portable terminal manufacturers have generally provided a wired charger capable of charging the battery.

In recent years, there is interest in a wireless charger for addressing the inconvenience of a wired charger. However, a portable terminal of the related art does not include a capability of being charged by the wireless charger. Accordingly, a wireless charger of the related art cannot charge the battery. Due to this, a portable terminal user must charge the battery using the wired charger, thereby causing the inconvenience.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above problems and/or disadvantages and to provide at least the advantages described below. Accordingly, an aspect of the present invention is to provide a wired/wireless charging apparatus capable of performing wired charging and wireless charging and a circuit thereof.

In accordance with an aspect of the present invention, a wired/wireless charging apparatus is provided. The wired/wireless charging apparatus includes a body including a wired charging circuit for wired charging, a wireless charging circuit for wireless charging, and a battery mounting space, a cover coupled with the body and including a transmission coil generating a magnetic field for the wireless charging, wherein the body and the cover including a contact unit for electrically connecting the transmission coil to the wireless charging circuit.

In accordance with another aspect of the present invention, a wired/wireless charging circuit is provided. The wired/wireless charging circuit includes a power input unit connected to a power supply, a voltage down converter down-converting an output voltage of the power input unit, a wired charging unit generating a charged current using output power of the voltage down converter, a battery contact unit connected to a battery in a wired scheme to transmit the charged current from the wired charging unit to a battery connected in a wired scheme, a wireless charging unit converting output power of the power supply into Alternating Current (AC) power, a transmission coil generating a magnetic field based on the AC power from the wireless charging unit, and a contact unit electrically connecting the transmission coil to the wireless charging unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a detailed description, wireless charging may be classified into an electromagnetic induction scheme and a magnetic resonance scheme. The electromagnetic induction scheme changes a magnetic field by applying AC current to a transmission coil for wireless power transmission, and charges a battery through an induction current generated from an adjacent reception coil due to change in the magnetic field. The electromagnetic induction scheme has a disadvantage that the reception coil must be located adjacent to the transmission coil. Meanwhile, in the magnetic resonance scheme, the transmission coil radiates a magnetic field with a specific frequency, if a reception coil having the same frequency as that of the transmission coil approaches to the transmission coil, the transmission coil receives power through an energy tunnel generated due to resonance to charge the battery. The magnetic resonance scheme may charge the battery as compared with the electromagnetic induction scheme, is harmless to a human body, and has high transmission efficiency.

Figure 1:
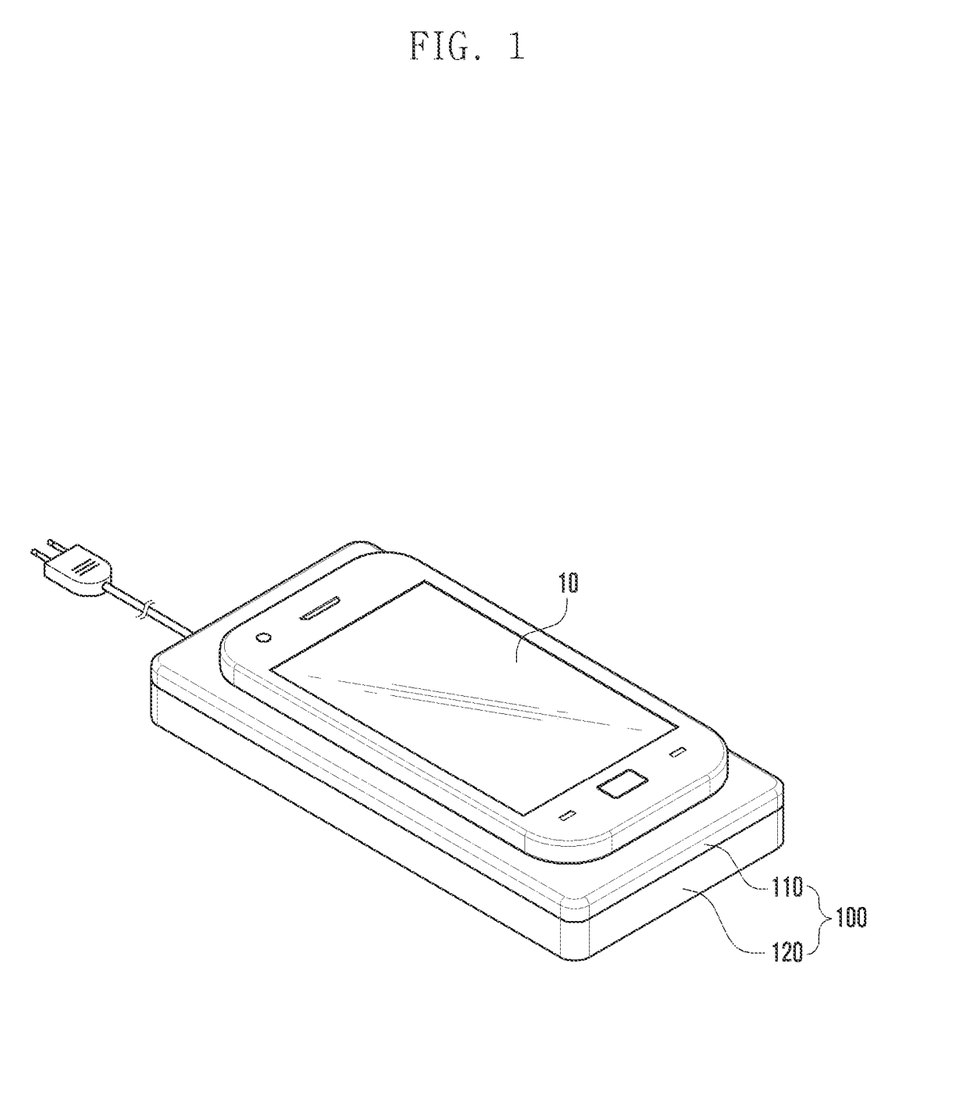
FIG. 1 is a block diagram illustrating a configuration of a charging position using a wired/wireless charging apparatus according to an exemplary embodiment of the present invention.
Figure 2A:
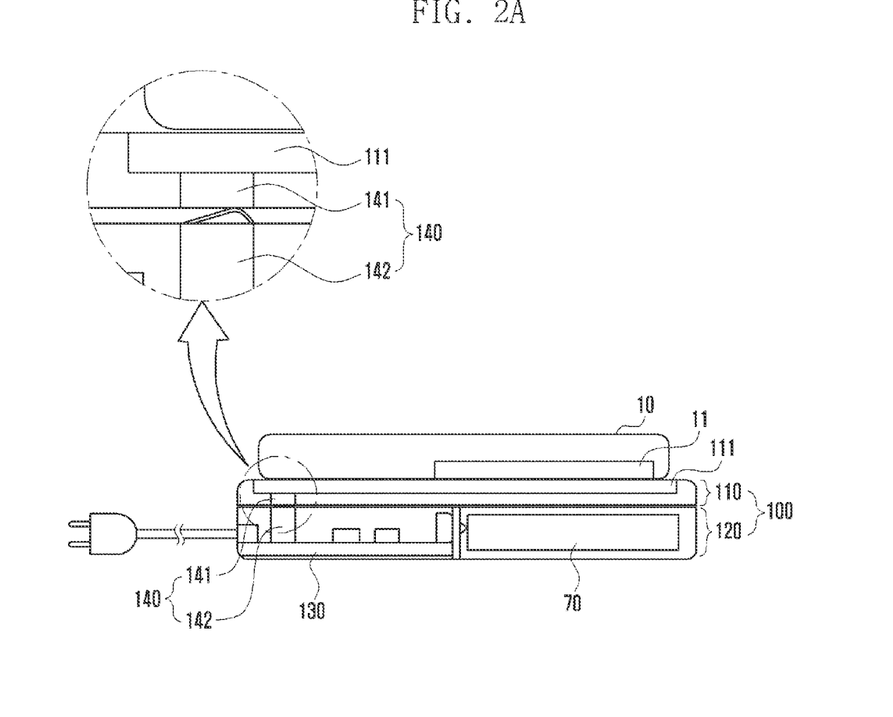
FIGS. 2A and 2B are a sectional view schematically illustrating a wired/wireless charging apparatus according to a first exemplary embodiment of the present invention.
Figure 2B:
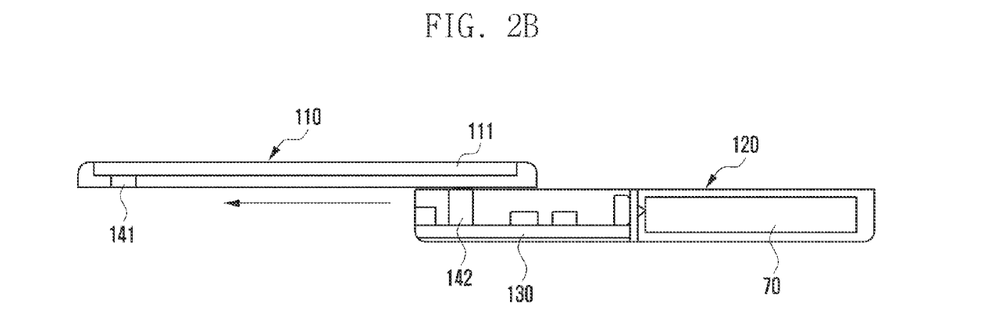

FIG. 1 is a block diagram illustrating a configuration of a charging position using a wired/wireless charging apparatus according to an exemplary embodiment of the present invention. FIGS. 2A and 2B are sectional views schematically illustrating a wired/wireless charging apparatus according to a first exemplary embodiment of the present invention.

Referring to FIGS. 1, 2A and 2B, the wired/wireless charging apparatus 100 according to a first exemplary embodiment of the present invention includes a rectangular body 120 and a cover 110 covering a top surface of the body 120.

The body 120 has a battery mounting space. The body 120 may include a Printed Circuit Board (PCB) 130 in which a plurality of components (e.g., wired charging circuit, wireless charging circuit, etc.) for wired/wireless charging are mounted. The components mounted in the PCB 130 will be described further below with reference to FIGS. 7 and 8. The cover 110 may be coupled with the body 120 in a sliding scheme. In particular, the cover 110 according to the present exemplary embodiment may include a transmission coil 111 generating a magnetic field for wireless charging. As the transmission coil 111 is provided at the cover 110 and the PCB 130 for supplying an electric current to the transmission coil 111 is provided at the body 120, the wired/wireless charging apparatus 100 includes a contact unit 140 for electrically connecting the transmission coil 111 to the PCB 130. For example, as shown in FIGS. 2A and 2B, the contact unit 140 may include a contact pad 141 and a contact terminal 142. As shown in FIGS. 2A and 2B, the contact pad 141 includes a metal pad of a predetermined shape (for example, rectangle), and the contact terminal 142 may include a metal terminal having elasticity protruding to an outer side.

The transmission coil 111 may be electrically connected or isolated to or from the PCB 130 of the body 120 according to the open/close state of the cover 120. In detail, when the cover 110 is closed, as shown in FIG. 2A, the contact pad 141 is electrically connected to the contact terminal 142 so that an electric current is supplied to the transmission coil 111. The transmission coil 111 having received the electric current may generate a magnetic field for wireless charging. In this case, due to the magnetic field, an induction current is generated in the reception coil 11 included in the portable terminal 10, and the battery 70 of the portable terminal 10 may be charged with the generated induction current. When using the magnetic resonance scheme, the transmission coil 111 may generate a magnetic field with a specific frequency. The wireless charging technology is generally known in the art, and will be apparent to persons of ordinary skill to which the present disclosure pertains, and thus a detailed description thereof is omitted. Conversely, when the cover 110 is open, as shown in FIG. 2B, an electric connection between the contact pad 141 and the contact terminal 142 is isolated so that an electric current is not supplied to the transmission coil 111.

A user using the wired/wireless charging apparatus 100 locks the battery 70 in a battery mounting space of the body 120 to individually charge the battery 70 in a wired charging scheme. The user may place the portable terminal 10 having a wireless charging circuit on the cover 110 to charge a battery mount in the portable terminal 10 in a wireless charging scheme. That is, the present exemplary embodiment may simultaneously or individually perform wired charging and wireless charging through one device. Due to this, the present exemplary embodiment can improve efficiency and convenience for the user of the charging apparatus. Since a manufacturer of the portable terminal does not separately manufacture the wired charging apparatus and the wireless charging apparatus, a manufacturing cost of an accessory can be reduced.

Meanwhile, FIGS. 1, 2A, and 2B show that the wired/wireless charging apparatus 100 has a size larger than that of the portable terminal 10, but the wired/wireless charging apparatus 100 may have a size smaller than that of the portable terminal 10. That is, the battery 70 may be mounted in the wired/wireless charging apparatus 100, and may have the size capable of mounting the portable terminal 10. FIGS. 1, 2A, and 2B show only an example of charging the portable terminal 10 using the wired/wireless charging apparatus 100 in a wireless scheme, but the present exemplary embodiment may charge the battery 70 having a wireless charging circuit using the wired/wireless charging apparatus 100.

Figure 3:
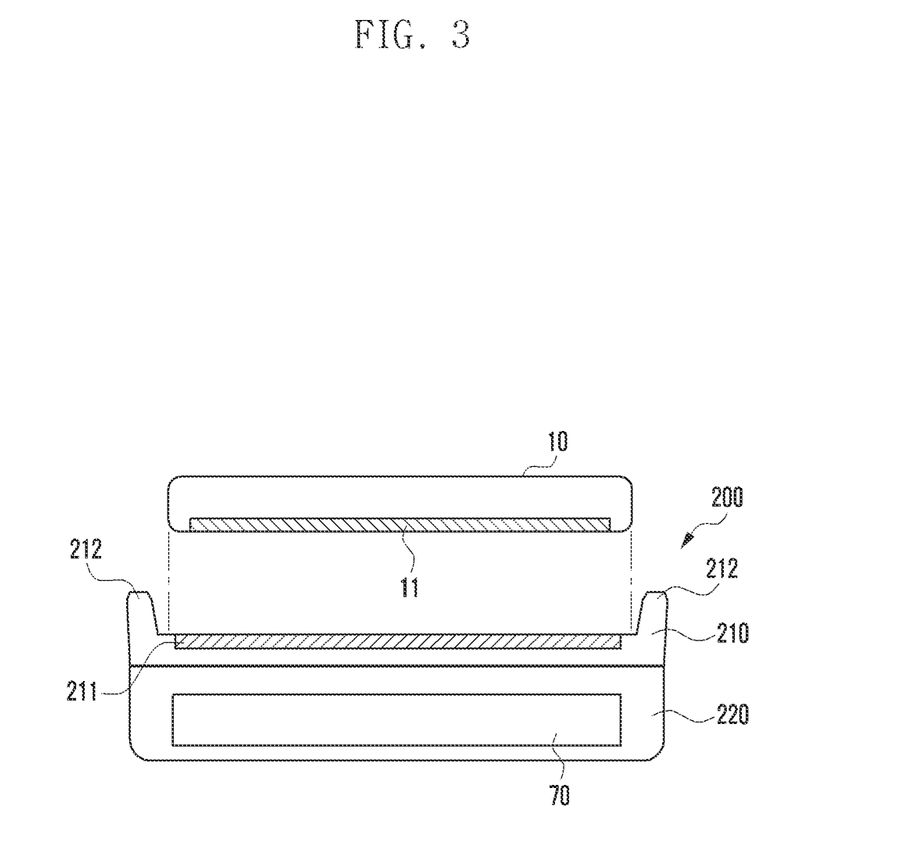
FIG. 3 is a schematic view illustrating a wired/wireless charging apparatus according to a second exemplary embodiment of the present invention.

FIG. 3 is a schematic view illustrating a wired/wireless charging apparatus according to a second exemplary embodiment of the present invention.

Referring to FIGS. 1 and 3, the wired/wireless charging apparatus 200 according to the second exemplary embodiment of the present exemplary embodiment includes a body 220 and a cover 210.

The cover 210 may include a protrusion 212 provided at both sides of the cover 210. When the portable terminal 100 is placed on the cover 210 of the wired/wireless charging apparatus 200, the protrusion 212 guides the portable terminal 10 not to be moved. This is because locations of the transmission coil 211 and the reception coil 11 significantly affect the charging efficiency in a case of wireless charging. That is, when the reception coil 11 is located away from the transmission coil 211, wireless charging efficiency is lowered. Accordingly, the second exemplary embodiment of the present invention may prevent charging efficiency from being lowered when the user places the portable terminal 10 on a location of poor charging efficiency, or the portable terminal 10 is moved. Meanwhile, other constituent elements (for example, a body 220 in which the battery 70 is mounted) of the wired/wireless charging apparatus 200 are the same as or similar to those of the first exemplary embodiment.

Figure 4A:
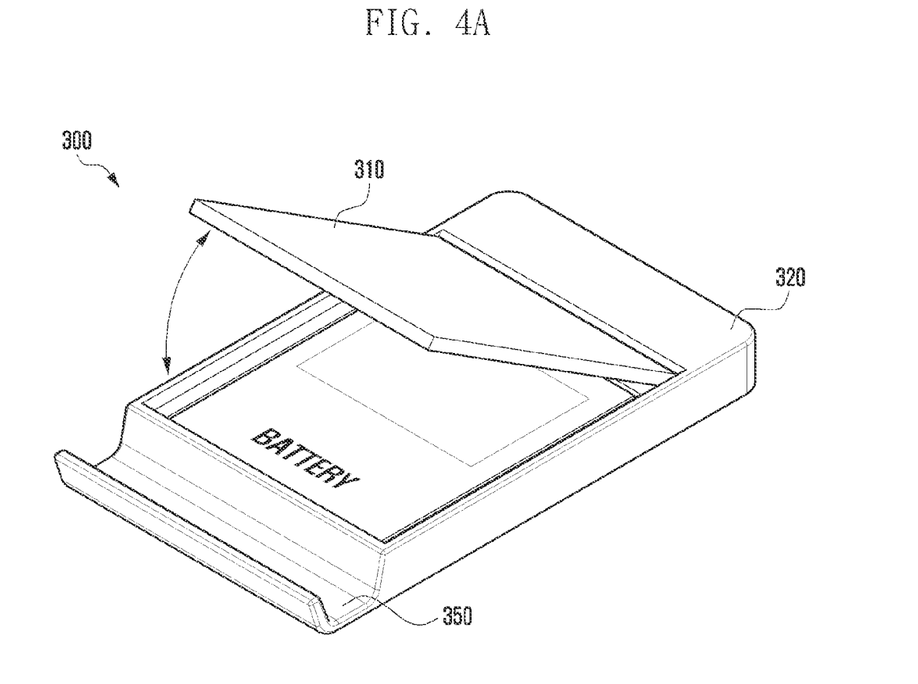
FIGS. 4A and 4B are perspective views schematically illustrating a wired/wireless charging apparatus according to a third exemplary embodiment of the present invention.
Figure 4B:
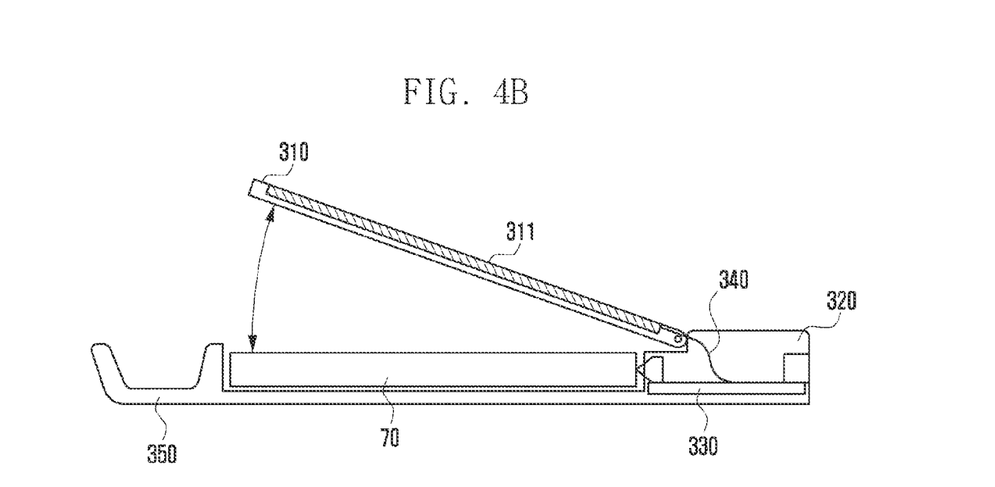

FIGS. 4A and 4B are perspective views schematically illustrating a wired/wireless charging apparatus according to a third exemplary embodiment of the present invention.

Referring to FIGS. 4A and 4B, the wired/wireless charging apparatus 300 according to the third exemplary embodiment of the present invention may include a body 320, a cover 310, and a mount 350.

In the wired/wireless charging apparatus 300, the cover 310 may be formed in an opening/closing scheme which is open/closed based on a rotating axis formed at one side of the body 320 rather than a sliding scheme. In this case, a transmission coil 311 mounted at the cover 310 may be connected to a PCB 330 of the body 320 through a Flexible PCB (FPCB) 340. Both sides of the FPCB 340 may be connected to the transmission coil 311 and the PCB 330, respectively. To this end, the body and the cover may include a locking part (not shown) into which one side of the FPCB is inserted. That is, in the third exemplary embodiment of the present invention, the transmission coil is essentially connected to the PCB 330 regardless of an open/closed state. A connection scheme through the FPCB 340 is generally used in a folder type portable terminal or a sliding type portable terminal, and thus a detailed description thereof is omitted herein.

Meanwhile, the wired/wireless charging apparatus 300 may further include a mount 350 having a predetermined angle for horizontally and vertically mounting the portable terminal 100. FIGS. 4A and 4B show that the mount 350 has a U shape, but the present invention is not limited thereto. For example, the mount 350 may have various structures capable of mounting the portable terminal 100 at a predetermined angle. The wired/wireless charging apparatus 300 according to the third exemplary embodiment of the present invention can provide a wired charging function and a wireless charging function for individual charging of the battery 70, and a mount function so that efficiency and convenience for a user of the apparatus can be improved.

Figure 5:
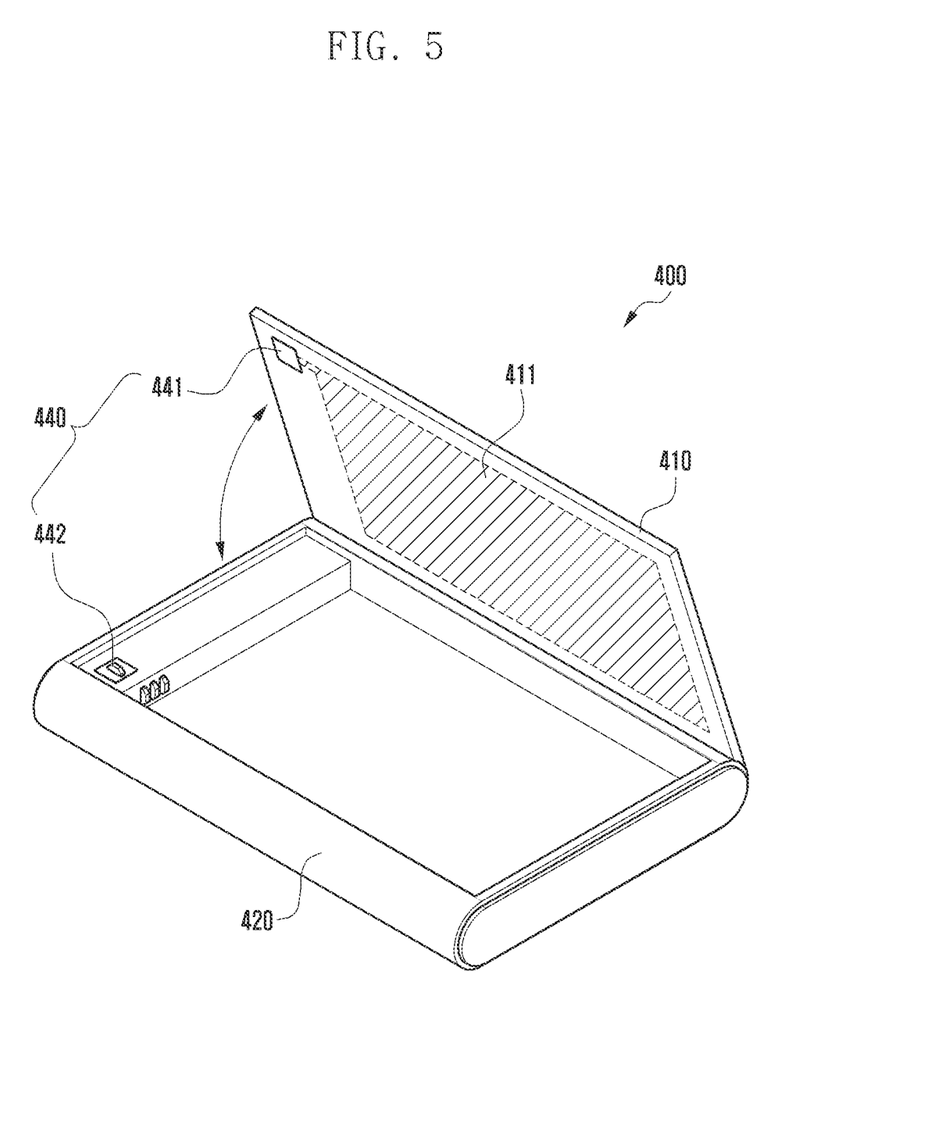
FIG. 5 is a perspective view schematically illustrating a wired/wireless charging apparatus according to a fourth exemplary embodiment of the present invention.

FIG. 5 is a perspective view schematically illustrating a wired/wireless charging apparatus according to a fourth exemplary embodiment of the present invention.

Referring to FIG. 5, in the wired/wireless charging apparatus 400 of the portable terminal according to the fourth exemplary embodiment of the present invention, a cover 410 may be formed in an opening/closing scheme as in the third exemplary embodiment. The cover 310 is rotated based on a short axis of the body 320 in the third exemplary embodiment, whereas the cover 410 is rotated based on a long axis of the body 420 in the fourth exemplary embodiment of FIG. 5. In this case, the wired/wireless charging apparatus 400 according to the fourth exemplary embodiment may include a contact unit 440 having a contact pad 441 and a contact terminal 442 similar to the first exemplary embodiment.

When the cover 410 is closed through the contact unit 440, a transmission coil 411 disposed at the cover 410 may receive an electric current.

Figure 6A:
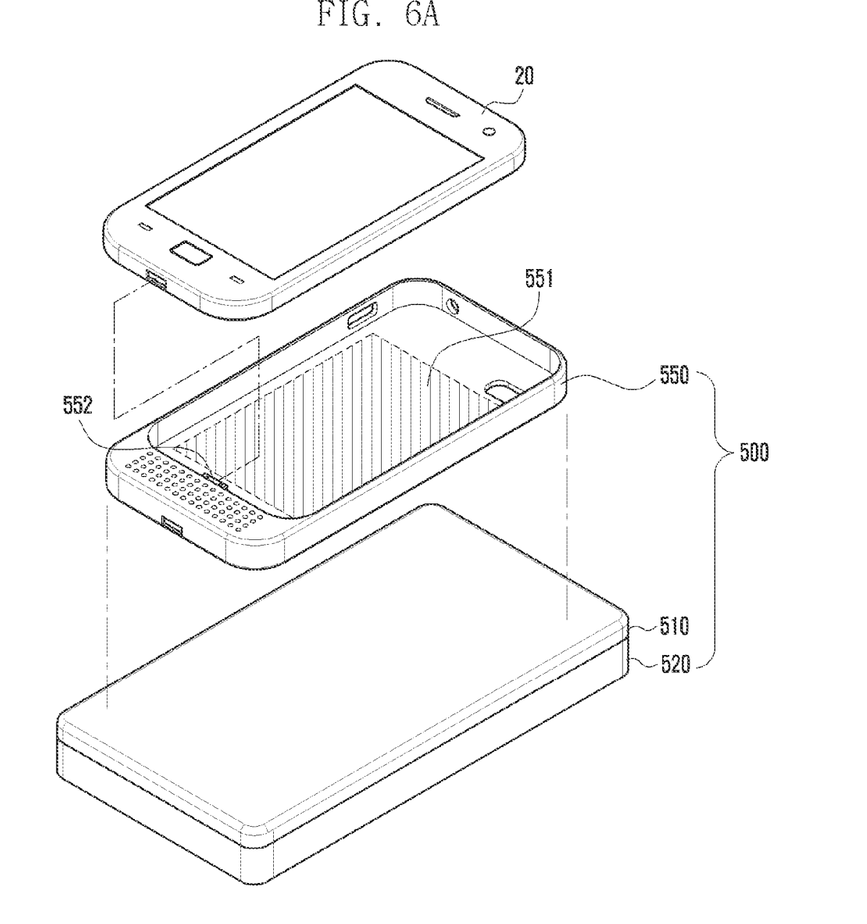
FIGS. 6A and 6B are schematic views illustrating a wired/wireless charging apparatus according to a fifth exemplary embodiment of the present invention.
Figure 6B:
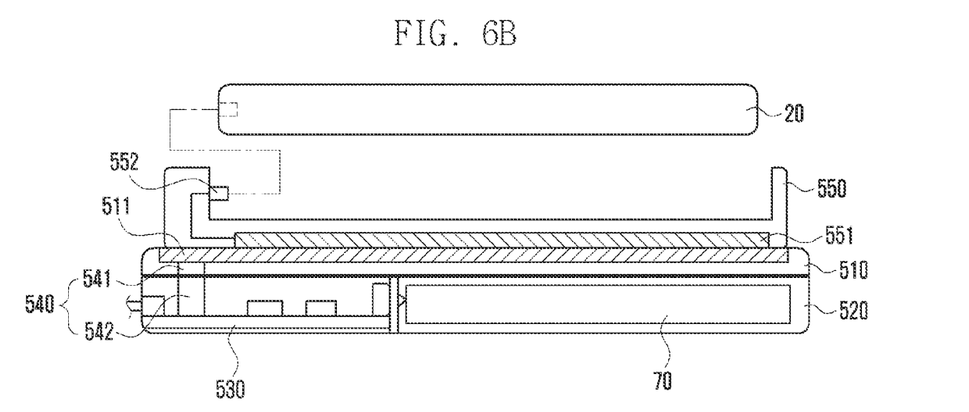

FIGS. 6A and 6B are schematic views illustrating a wired/wireless charging apparatus according to a fifth exemplary embodiment of the present invention.

Referring to FIGS. 6A and 6B, the wired/wireless charging apparatus 500 is an apparatus for charging the portable terminal 20 without a wireless charging circuit. That is, the wired/wireless charging apparatus 500 according to the fifth exemplary embodiment may include a cover 510, a body 520, and a charging case 550. The charging case 550 may include a receptacle in which the portable terminal 20 is disposed. The charging case 550 may protect the portable terminal 20.

The charging case 550 includes a reception coil 551 generating an induction current due to a magnetic field of the transmission coil 511, and may transmit an electric current induced through the reception coil 551 to the portable terminal 20 without a wireless charging function. To this end, the charging case 550 may include an interface part 552 connected to the portable terminal 20 in a wired scheme. The wired/wireless charging apparatus 500 according to the fifth exemplary embodiment of the present invention is similar to the wired/wireless charging apparatus 100 described with reference to FIGS. 1, 2A, and 2B except that the wired/wireless charging apparatus 500 further includes the charging case 550. Accordingly, a detailed description of other constituent elements 510, 511, 520, 530, 540, 541, 542, and 70 is omitted since they are similar to elements 110, 111, 120, 130, 140, 141, 142, and 70 described above with respect to FIGS. 1, 2A, and 2B.

Meanwhile, although not shown in FIGS. 6A and 6B, the charging case 550 may further include a circuit for converting the induced current suited to a charging standard of a charging part (not shown) of the portable terminal 20, for example, a rectifier for converting AC current into DC current and a Low voltage Drop Output (LDO) for converting an output current of the rectifier into a constant voltage (e.g., 5V). FIGS. 6A and 6B show the cover 510 and the body 520 based on the first exemplary embodiment, but the present invention is not limited thereto. That is, it will be apparent to persons of ordinary skill to which the present disclosure pertains that the cover 510 and the body 520 according to the fifth exemplary embodiment may be formed as in the second to fourth exemplary embodiments, or by a combination of the first to fourth exemplary embodiments.

The foregoing exemplary embodiment has illustrated wired/wireless charging apparatuses according to various exemplary embodiments of the present invention. Hereinafter, a wired/wireless charging circuit applicable to all wired/wireless charging apparatuses according to the various exemplary embodiments of the present invention will be described.

Figure 7:
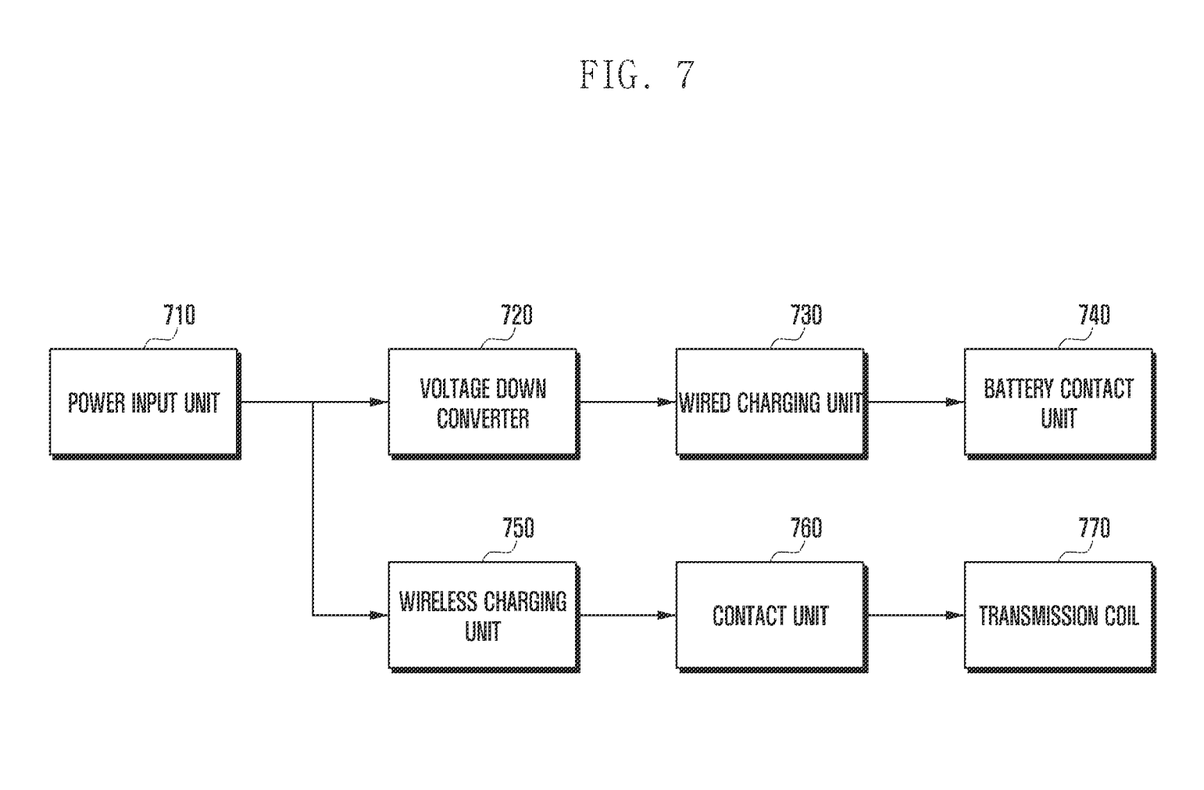
FIG. 7 is a block diagram illustrating a wired/wireless charging apparatus according to the first exemplary embodiment of the present invention.

FIG. 7 is a block diagram illustrating a wired/wireless charging apparatus according to a first exemplary embodiment of the present invention.

Referring to FIG. 7, the wired/wireless charging circuit according to the first exemplary embodiment of the present invention may include a power input unit 710, a voltage down converter 720, a wired charging unit 730, a battery contact unit 740, a wireless charging unit 750, a contact unit 760, and a transmission coil 770.

The power input unit 710 may be connected to a power supply device, for example, a Travel Adapter (TA) or a Travel Charger (TC) converting Alternating Current (AC) power into Direct Current (DC) power. The power input unit 710 is connected to a travel charger (hereinafter referred to as 'wired/wireless charger') having an output power of 12V or 19V according to a wireless charging standard. The power input unit 710 according to the first exemplary embodiment of the present invention may have a separate interface standard other than an interface standard (e.g., 20 pin interface, micro Universal Serial Bus (USB) interface) of a travel charger (hereinafter referred to as 'wired charger') generally used for a portable terminal according to the related art. This is applied to prevent the wired charger according to the related art from being erroneously inserted in the power input unit 710. The power input unit 710 may supply power from the wired/wireless charger to the wireless charging unit 750.

The wireless charging unit 750 may convert DC power from the power input unit 710 into AC power and apply the converted AC power to the transmission coil 770. Meanwhile, the wireless charging unit 750 may include various circuits for increasing conversion efficiency and charging efficiency. When using the magnetic resonance scheme, the wireless charging unit 750 may include a resonance circuit. The wireless charging unit 750 is generally known in the art, and thus a detailed description thereof is omitted.

The contact unit 760 is provided between the wireless charging unit 750 and the transmission coil 770. The contact unit 760 may turn-on/off electric connection between the wireless charging unit 750 and the transmission coil 770 according to an open/closed state of the cover as described above. For example, as shown in FIGS. 2A, 2B and 5, the contact unit 760 may include a contact pad 141 or 441 located at the cover and a contact terminal 142 or 442 having elastic force located at the body. As shown in FIG. 4, the contact unit 760 may be configured by an FPCB 340. In this case, the wireless charging unit 750 is essentially connected to the transmission coil 770.

The transmission coil 770 may generate a magnetic field based on AC power from the wireless charging unit 750. The magnetic field generates an induction current in a reception coil 11 of a portable terminal 10 or a wireless chargeable battery. The transmission coil 770 may have a rectangular or circular shape, and a plurality of transmission coils 770 may be provided.

The voltage down converter 720 may down-convert an output voltage (e.g., 12V or 19V) of the power input unit 710 to a voltage (e.g., 5V) suited to wireless charging, and transmit the down-converted power to the wired charging unit 730. The voltage down converter may include a DC-DC down converter. The wired charging unit 730 may generate a charged current using power from the voltage down converter 720. The wired charging unit 730 is generally known in the art, and thus a detailed description thereof is omitted. The battery contact unit 740 is connected to the battery 70 in a wired scheme and may transmit a charged current of the wired charging unit 730 to the connected battery 70.

Figure 8:
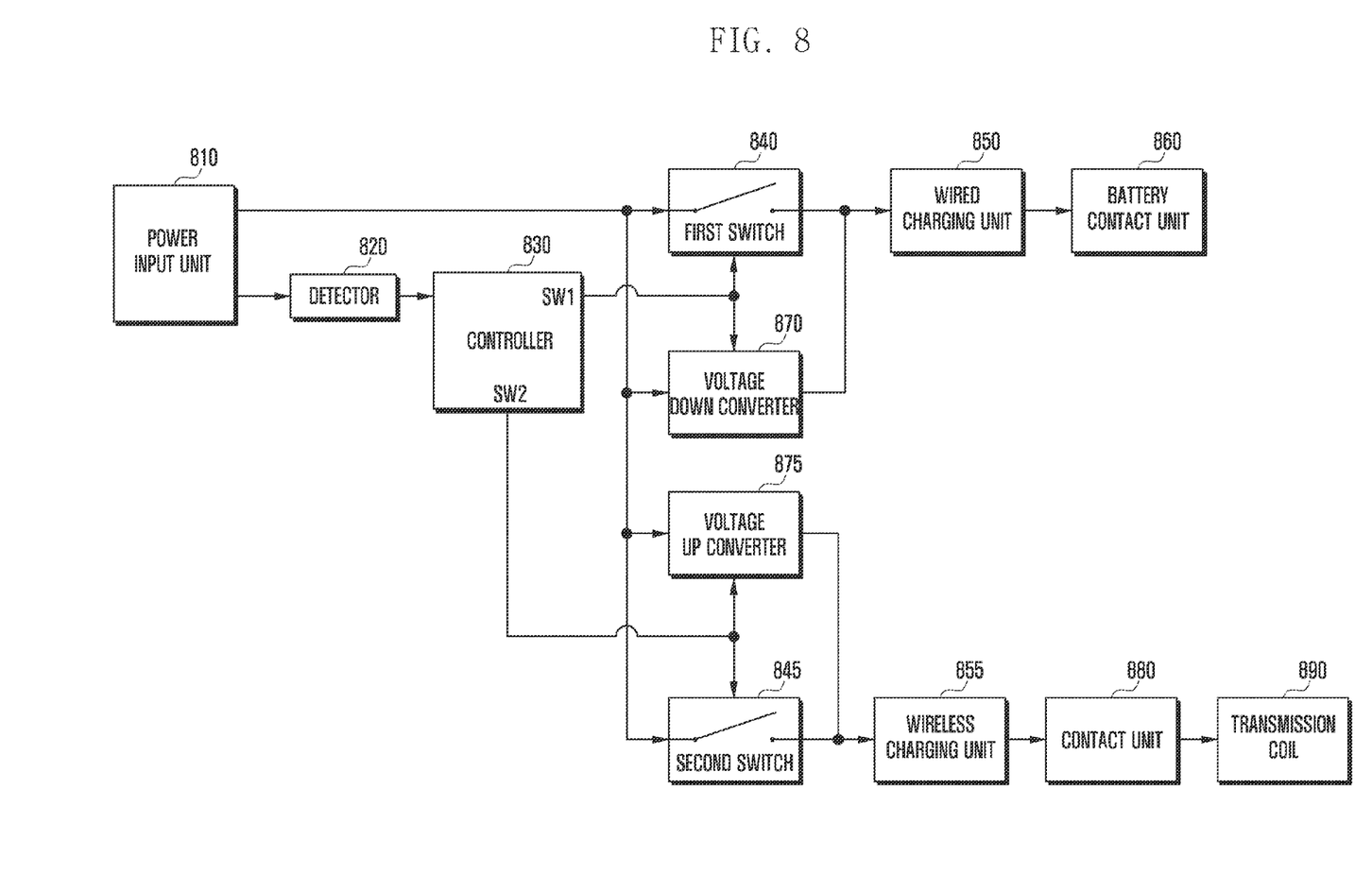
FIG. 8 is a block diagram illustrating a wired/wireless charging apparatus according to the second exemplary embodiment of the present invention.

FIG. 8 is a block diagram illustrating a wired/wireless charging apparatus according to a second exemplary embodiment of the present invention.

Referring to FIG. 8, the wired/wireless charging circuit according to the second exemplary embodiment of the present invention may include a power input unit 810, a detector 820, a controller 830, a first switch 840, a second switch 845, a wired charging unit 850, a wireless charging unit 855, a battery contact unit 860, a voltage down converter 870, a voltage up converter 875, a contact unit 880, and a transmission coil 890.

The power input unit 810 may be connected to a power supply device, for example, a TA or a TC converting AC power into DC power. Particularly, the power input unit 810 according to the second exemplary embodiment of the present invention may have the same interface standard as that of the wired charger according to the related art. This is applied to charge a battery through the wired charger according to the related art. This is for the purpose of being compatible with the wired charger according to the related art. Accordingly, the power input unit 810 may be connected to a power supply (e.g., wired/wireless charger) having an output voltage equal to or greater than a preset reference value and a power supply (e.g., wired charger, micro USB cable, etc.) having an output voltage less than the preset reference value.

The detector 820 may recognize a type of a power supply connected to the power input unit 810. In detail, the detector 820 confirms an input voltage. When the input voltage is equal to or greater than the reference value (e.g., 12V or 19V), the detector 820 may recognize that a wired/wireless charger is connected. When the input voltage is less than the reference value (e.g., 5V), the detector 820 may recognize connection of the wired charger or the micro USB cable through presence of a connection of the data lines D+ and D−. When the data lines D+ and D− are connected, the detector 820 recognizes that the wired charger is connected. When the data lines D+ and D− are not connected, the detector 820 recognizes that the micro USB cable is connected. Next, the detector 820 may transmit the recognized type of the charger to the controller 830.

The controller 830 may control an overall operation of the wired/wireless charging circuit according to the type of the connecter charger. To this end, the controller 830 may include a first control terminal SW1 for controlling ON/OFF of the first switch 840 and the voltage down converter 870, and a second control terminal SW2 for controlling ON/OFF of the second switch 845 and the voltage up converter 875. In detail, when the power supply (e.g., wired/wireless charger) having an output voltage equal to or greater than a preset reference value is connected to the power input unit 810, the controller 830 may turn-off the first switch 840 but turn-on the voltage down converter 870 so that the voltage down converter 870 down-converts a voltage from the power input unit 810 to thereby perform wired charging, and may turn-on the second switch 845 and turn-off the voltage up converter 875 so that wireless charging is performed using the power from the power input unit 810. That is, the controller may 830 control such that a voltage (e.g., 12V or 19V) of the wired/wireless charger is converted into a voltage (e.g., 5V) suitable for wired charging through the voltage down converter 870 and then the converted voltage is output to the wired charging unit 850, and the voltage (e.g., 12V or 19V) of the wired/wireless charger is supplied to the wireless charging unit 855 without the voltage conversion.

Meanwhile, when the power supply (e.g., wired charger, micro USB cable, etc.) having an output voltage less than the preset reference value is connected to the power input unit 810, the controller 830 may turn-on the first switch 840 but turn-off the voltage down converter 870 so that wired charging is performed using power from the power input unit 810, and may turn-off the second switch 845 but turn-on the voltage up converter 875 so that the voltage up converter 875 up-converts the voltage from the power input unit 810 to thereby perform wireless charging. That is, the controller 830 may control such that a voltage (e.g., 5V) of the wired charger or the micro USB is supplied to the wired charging unit 850 without voltage conversion, and the voltage (e.g., 5V) of the wired charger or the micro USB is converted into a voltage (e.g., 12V or 19V) suitable for wireless charging through the voltage up converter 875 and then the converted voltage is supplied to the wireless charging unit 855. When the wired charging and the wireless charging are simultaneously performed, the controller 830 may suitably control a charging order and a charged current amount. For example, when the power from the power input unit 810 is insufficient to simultaneously charge the wired charging and the wireless charging with maximum current, the controller 830 may control such that one of the wired charging and the wireless charging is preferentially performed.

The first switch 840 may be provided between the power input unit 810 and the wired charging unit 850 to turn-on/off electric connection between the power input unit 810 and the wired charging unit 850 under the control of the controller 830. In detail, when a wired/wireless charger is connected to the power input unit 810, the first switch 840 may be turned-off. When a wired charger or a USB cable is connected to the power input unit 810, the first switch 840 may be turned-on.

The second switch 845 may be provided between the power input unit 810 and the wireless charging unit 855 to turn-on/off electric connection between the power input unit 810 and the wireless charging unit 855 under the control of the controller 830. In detail, when a wired/wireless charger is connected to the power input unit 810, the second switch 845 may be turned-on. When a wired charger or a USB cable is connected to the power input unit 810, the second switch 840 may be turned-off.

The voltage down converter 870 may down-convert an output voltage of the power input unit 810. That is, when the wired/wireless charger is connected to the power input unit 810, the voltage down converter 870 may be turned-on to down-convert a voltage (e.g., 12V or 19V) of the wired/wireless charger into a voltage (e.g., 5V) suitable for wired charging, and to transmit the converted voltage to the wired charging unit 850. When the wired charger or the micro USB cable is connected to the power input unit 810, the voltage down converter 870 may be turned-off. The voltage down converter 870 may include a DC-DC down converter.

When the wired/wireless charger is connected to the power input unit 810, the wired charging unit 850 may charge a battery 70 contacting with the battery contact unit 860 using power from the voltage down converter 870. When the wired charger or the USB cable is connected to the power input unit 810, the wired charging unit 850 may charge the battery 70 contacting with the battery contact unit 860 using the power from the power input unit 810.

The voltage up converter 875 may up-convert an output voltage of the power input unit 810. That is, when the wired charger or the micro USB cable is connected to the power input unit 810, the voltage down converter 875 may be turned-on to up-convert a voltage (5V) of the wired charger or the micro USB cable into a voltage (e.g., 12V or 19V) suitable for wireless charging, and to transmit the converted voltage to the wireless charging unit 855. When the wired/wireless charger is connected to the power input unit 810, the voltage up converter 875 may be turned-off. The voltage up converter 875 may include a DC-DC up converter.

The wireless charging unit 855 may convert output power of a power supply connected to the power input unit 810 into AC power. That is, when the wired/wireless charger is connected to the power input unit 810, the wireless charging unit 855 may convert DC power from the wired/wireless charger into AC power and supply the converted AC power to the transmission coil 890. When the wired charger or the USB cable is connected to the power input unit 810, the wireless charging unit 855 may convert DC power from the voltage up converter 875 into AC power and supply the converted AC power to the transmission coil 890. In this case, the wireless charging unit 855 may include various circuits for increasing conversion efficiency and charging efficiency. When using the magnetic resonance scheme, the wireless charging unit 855 may include a resonance circuit. The charging unit 855 is generally known in the art, and thus a detailed description thereof is omitted.

The contact unit 880 may be provided between the wireless charging unit 855 and the transmission coil 890 to control electric connection between the wireless charging unit 855 and the transmission coil 890. For example, as shown in FIGS. 2A, 2B, and 5, the contact unit 880 may include a contact pad 141 or 441 provided at the cover and a contact terminal 142 or 442 having elastic force provided at the body. As shown in FIGS. 4A and 4B, the contact unit 880 may be configured by an FPCB 340. In this case, the wireless charging unit 855 is essentially connected to the transmission coil 890.

The transmission coil 890 may generate a magnetic field based on AC power from the wireless charging unit 855. The transmission coil 890 may have a rectangular or circular shape, and a plurality of transmission coils 890 may be provided.

Meanwhile, charged power of a power supply (wired charger, micro USB cable, etc.) having an output voltage less than the reference value may be less than power required for the wireless charging. In detail, power of 5 W is required for the wireless charging. However, in general, the wired charger supplies charged power of 3.5 W (=5V*700 mA), and the micro USB cable supplies charged power of 2.5 W (=5V*500 mA). Accordingly, when the wired charger or the micro USB cable is connected, although the wireless charging is possible using the voltage up converter, a charging time becomes long. As a result, another exemplary embodiment of the present invention may restrict such that only the wired charging is possible when the wired charger or the micro USB cable is connected.

In a case where the wired charger or the micro USB cable is connected, when only the wired charging is possible, the voltage up converter 875 and the second switch 845 may be omitted in FIG. 8. In this case, when a power supply (wired charger, micro USB cable, etc.) having an output voltage less than a reference value is connected, the controller 830 may turn-on the first switch 840 and turn-off the voltage down converter 870 and the wireless charger 855 so that only wired charging is possible. On the contrary, when a power supply (wired/wireless charger) having an output voltage equal to or greater than the reference value is connected, the controller 830 may turn-on the voltage down converter 870 but turn-off the first switch 840 so that the voltage down converter 870 down-converts a voltage from the power input unit 810 to thereby perform the wired charging, and may turn-on the wireless charging unit 855 so that the wireless charging may be performed using the power from the power input unit 810.

As mentioned above, the wired/wireless charging apparatus and a circuit thereof may simultaneously or individually perform wired charging and wireless charging. For example, the exemplary embodiments of the present invention can individually charge an embedded battery in a wired scheme, and can charge a battery embedded in the portable terminal or a wireless chargeable battery in a wireless scheme. Different from the related art which individually uses a wired charger and a wireless charger, the exemplary embodiments of the present invention can perform both the wired charging and the wireless charging so that the efficiency and convenience for a user of the charging apparatus can be improved. A manufacturer of the portable terminal does not separately manufacture a wired charger and a wireless charger so that a manufacturing cost of an accessory can be reduced.

While the invention has been shown and described with reference to certain exemplary embodiments thereof, it will be understood by those skilled in the art the spirit and scope of the invention as defined by the appended claims and their equivalents.

What is claimed is:

1. A wired/wireless battery charging apparatus for a portable terminal, the apparatus comprising:
    a body including a wired charging circuit for wired charging a first battery of the portable terminal, a wireless charging circuit for wireless charging a second battery mounted in the portable terminal, and a battery mounting space for mounting the first battery;
    a cover removably coupled with the body, the cover including a transmission coil generating a magnetic field for the wireless charging of the second battery; and
    a cavity exposed by removing the cover,
    wherein the body and the cover includes a contact unit for electrically connecting the transmission coil to the wireless charging circuit,
    wherein the transmission coil is electrically connected with the wireless charging circuit through the contact unit when the cover is closed,
    wherein the wired charging circuit charges the first battery when the first battery is disposed in the cavity, and
    wherein the wireless charging circuit charges the second battery when the portable terminal is proximate to the cover.

2. The wired/wireless charging apparatus of claim 1, wherein the cover is coupled with the body in one of a sliding scheme and an opening/closing scheme in which the cover is open or closed based on a rotating axis.

3. The wired/wireless charging apparatus of claim 2, wherein the contact unit comprises:
    a contact pad coupled to the transmission coil at the cover; and
    a contact terminal coupled to the wireless charging circuit at the body,
    wherein the contact terminal is electrically connected to the contact pad when the cover is closed and the contact terminal is electrically isolated from the contact pad when the cover is open.

4. The wired/wireless charging apparatus of claim 3, wherein the contact pad includes a metal pad of a predetermined shape and the contact terminal includes a metal terminal having elasticity protruding to an outer side of the body.

5. The wired/wireless charging apparatus of claim 2, wherein the contact unit further comprises a flexible printed circuit board having two sides, one side of the flexible printed circuit board connected to the transmission coil and the other side of the flexible printed circuit board connected to the wireless charging circuit.

6. The wired/wireless charging apparatus of claim 1, further comprising a mount mounting at least a portion of the portable terminal at a predetermined angle.

7. The wired/wireless charging apparatus of claim 1, wherein the cover further comprises a protrusion guiding the portable terminal so as not to be moved when the portable terminal is placed on the cover.

8. The wired/wireless charging apparatus of claim 1, further comprising:
    a charging case including a reception coil generating an induction current by the magnetic field from the transmission coil and an interface unit connected to the portable terminal in a wired scheme,
    wherein the charging case transmits the induction current to the portable terminal through the interface unit.

9. The wired/wireless charging apparatus of claim 8, wherein the charging case includes a receptacle in which the portable terminal is disposed and the charging case protects the portable terminal.

10. A wired/wireless charging circuit of a battery charging apparatus for a portable terminal, the charging circuit comprising:
    a power input unit connected to a power supply;
    a voltage down converter down-converting an output voltage of the power input unit;
    a wired charging unit generating a charged current for wired charging a first battery of the portable terminal using output power of the voltage down converter, the first battery being mounted in the battery charging apparatus;
    a battery contact unit connected to the first battery in a wired scheme to transmit the charged current from the wired charging unit to the first battery connected in a wired scheme;
    a wireless charging unit converting output power of the power supply into Alternating Current (AC) power;
    a transmission coil generating a magnetic field for wireless charging a second battery mounted in the portable terminal based on the AC power from the wireless charging unit; and
    a contact unit configured to electrically connect the transmission coil to the wireless charging unit.

11. The wired/wireless charging circuit of claim 10, further comprising:
    a detector recognizing a type of the power supply connected to the power input unit;
    a first switch provided between the power input unit and the wired charging unit; and
    a controller turning-on the voltage down converter and turning-off the first switch so that the voltage down converter down-converts a voltage from the power input unit to thereby perform wired charging when connection of a power supply having an output voltage equal to or greater than a preset reference value is recognized by the detector, and turning-on the wireless charging unit so that wireless charging is performed using power from the power input unit.

12. The wired/wireless charging circuit of claim 11, wherein the controller turns-off the voltage down converter and the wireless charging unit and turns-on the first switch so that only the wired charging is performed when connection of a power supply having an output voltage less than the preset reference value is recognized by the detector.

13. The wired/wireless charging circuit of claim 11, further comprising:
    a second switch provided between the power input unit and the wireless charging unit; and
    a voltage up converter up-converting the output voltage of the power input unit.

14. The wired/wireless charging circuit of claim 13, wherein the controller turns-on the voltage down converter and turns-off the first switch so that the voltage down converter down-converts the power from the power input unit to thereby perform the wired charging when connection of a power supply having an output voltage equal to or greater than the preset reference value is recognized by the detector, and turns-on the second switch and turns-off the voltage up converter so that wireless charging is performed using the power from the power input unit.

15. The wired/wireless charging circuit of claim 13, wherein the controller turns-off the voltage down converter and turns-on the first switch so that the wired charging is performed using the power from the power input unit when connection of a power supply having an output voltage less than the preset reference value is recognized by the detector, and turns-on the voltage up converter so that the voltage up converter up-converts the power from the power input unit and turns-off the second switch so that the wireless charging is performed using the power converted by the voltage up converter.

* * * * *